United States Patent
Zhang et al.

(10) Patent No.: US 10,231,475 B2
(45) Date of Patent: Mar. 19, 2019

(54) **METHOD FOR PROCESSING *PACHYRHIZUS* JUICE CONCENTRATE WITH GOOD TASTE AND STABLE COLOR VALUE**

(71) Applicant: SDIC Zhonglu Fruit Juice Co., Ltd., Beijing (CN)

(72) Inventors: Jiming Zhang, Beijing (CN); Sixin Wang, Beijing (CN); Chuanzhu Leng, Beijing (CN); Xinfei Song, Beijing (CN); Nan Jiang, Beijing (CN); Ying Wang, Beijing (CN); Ying Yu, Beijing (CN); Yajun Sun, Beijing (CN); Rui Huang, Beijing (CN); Qingshan Zhang, Beijing (CN); Yaxu Yang, Beijing (CN); Xihong Li, Beijing (CN)

(73) Assignee: SDIC Zhonglu Fruit Juice Co., Ltd., Beijing (CN)

( * ) Notice: Subject to any disclaimer, the term of this patent is extended or adjusted under 35 U.S.C. 154(b) by 223 days.

(21) Appl. No.: 15/216,746

(22) Filed: Jul. 22, 2016

(65) Prior Publication Data
US 2017/0112169 A1  Apr. 27, 2017

Related U.S. Application Data

(63) Continuation of application No. PCT/CN2015/000893, filed on Dec. 14, 2015.

(30) Foreign Application Priority Data

Oct. 27, 2015 (CN) .......................... 2015 1 0705719

(51) Int. Cl.
| | |
|---|---|
| A23L 2/04 | (2006.01) |
| A23L 2/46 | (2006.01) |
| A23L 2/74 | (2006.01) |
| A23L 2/84 | (2006.01) |
| A23L 29/00 | (2016.01) |
| A23L 2/38 | (2006.01) |

(52) U.S. Cl.
CPC .................. *A23L 2/84* (2013.01); *A23L 2/04* (2013.01); *A23L 2/382* (2013.01); *A23L 2/46* (2013.01); *A23L 2/74* (2013.01); *A23L 29/06* (2016.08); *A23V 2002/00* (2013.01)

(58) Field of Classification Search
None
See application file for complete search history.

(56) References Cited

FOREIGN PATENT DOCUMENTS

CN       1817194 A  *  8/2006

* cited by examiner

*Primary Examiner* — Viren A Thakur
*Assistant Examiner* — Thanh H Nguyen
(74) *Attorney, Agent, or Firm* — W&K IP(Wayne & King)

(57) ABSTRACT

Disclosed is a method for processing *Pachyrhizus* juice concentrate with good taste and stable color value, with the steps as follows: (1) pretreatment of raw materials; (2) high-temperature enzymolysis: adding the high-temperature amylase for enzymolysis 30 min at 95° C.; (3) juicing; (4) pasteurization; (5) acidity adjustment; (6) enzymolysis: adding raw materials of glucoamylase 747 ml/T pectinase 50 ml/T, activated carbon 3 kg/T, bentonite 1 kg/T to the *Pachyrhizus* juice after acidity adjustment; (7) secondary pasteurization: cooling to 53° C.; (8) filtration; filtering through 0.45 um twice; (9) acidity adjustment, concentrating and cardboard filtration to obtain the finished product. The method for processing *Pachyrhizus* juice concentrate provided herein is proved through experiments that, the conventional method for color protection by adding VC is not applicable for *Pachyrhizus* juice concentrate, without adding VC, the browning during the product processing is significantly reduced, and the color value of final samples is well controlled; therefore, the method in the invention is simple, suitable for industrial production.

4 Claims, No Drawings

METHOD FOR PROCESSING *PACHYRHIZUS* JUICE CONCENTRATE WITH GOOD TASTE AND STABLE COLOR VALUE

CROSS-REFERENCE TO RELATED APPLICATIONS

This application is a continuation of International Patent Application No. PCT/CN2015/000893 with a filing date of Dec. 14, 2015, designating the United States, and further claims priority to Chinese Patent Application No. 201510705719.X with a filing date of Oct. 27, 2015. The content of the aforementioned applications, including any intervening amendments thereto, are incorporated herein by reference.

TECHNICAL FIELD

This invention relates to the field of fruit juice, in particular, to a method for processing *Pachyrhizus* juice concentrate with good taste and stable color value.

BACKGROUND OF THE PRESENT INVENTION

*Pachyrhizus*, also known as yarn bean, *Pachyrrhyizus erosus*, sweet potato, Rosa fruits, and ground radish, is a cultured species of *Leguminous pachyrhizus* that can form root tubers. It is an annual or perennial herbaceous twining vine, and it is native to tropical America, There are many cultivated species in Sichuan, Chongqing, Hubei and Hunan, Guangdong and Guangxi and Taiwan in China.

The edible part of *Pachyrhizus* is the large root tubers, which is rich in starch. According to the determination, each kilogram of root tuber contains 810~880 g of water, 76-119 g of carbohydrates and some minerals and vitamins. Its meat is white, tender, crisp, sweet, juicy, which can be eaten without cooking, or can be cooked, or processed into powder, having the cool and refreshing effect. *Pachyrhizus* has superior flavor and considerable medicinal value, and it has the efficacy of clearing heat and nourishing Yin and promoting secretion of saliva or body fluid, *Pachyrhizus* can be eaten naturally or juiced to drink, which can treat the fever, thirst, sore throat caused by cold; and the dysphoria with smothery sensation, hectic fever, night sweats, dysphoria hot, insomnia and women's menopausal symptoms caused by deficiency of yin and blood. At present, there are very fewer studies on the edible methods of *Pachyrhizus*, and almost no one develops it. The existing method of *Pachyrhizus* products is very simple, with less flavor. The edible part of *Pachyrhizus* is its root tubers in a spindle-shape or flat round shape, and its peel is pale yellow an d the flesh is white. *Pachyrhizus* is juicy, sweet, with unique aroma and flavors, and its juice yield rate is 70% to 75%. The tuber fruits are rich in water, carbohydrates and minerals, etc., which are the good sources of potassium, calcium, minerals and carbohydrates. It has the efficacy of producing saliva and slaking thirst, called "underground pear." However, its seeds, stems and leaves contain rotenone (C23H2206), which is highly toxic to humans and animals, and it can be made into DDVP and other pesticides.

CN103039902A disclosed high fructose syrup of *Pachyrhizus* made of the raw material *Pachyrhizus*. Its preparation contains the following steps: (1) pretreatment of raw materials: washing the *Pachyrhizus* clean and removing the peel, juicing it by a juicer, filtering to collect the *Pachyrhizus* juice; (2) Pulp mixing: adjusting the pH value of the *Pachyrhizus* juice obtained in step (1) with phosphoric acid to 6.0-7.0, adding amylase with the amount of 0.2-0.4% *Pachyrhizus* juice weight, and stirring well; (3) high temperature liquefaction: jetting the *Pachyrhizus* juice for liquefaction at 100~120° C., and the liquefaction time is controlled within 30-50 min, to prepare the liquefied solution; (4) saccharification: cooling down the liquid obtained in step (3) to 30~40° C., adjusting the pH value with hydrochloric acid to 4.5~5.5, and saccharifying by adding glucoamylase with the amount, of glucoamylase equal to 0.1~0.2% of the weight of liquid. The saccharification time is controlled within 42~56 hours; then heating to 85~95° C. for enzyme inactivation, to obtain the saccharification liquid, (5) heterogeneous conversion: adding sodium phosphate solution to the saccharification liquid obtained in step (4) to adjust pH value to 5.7~6.7, then adding glucose isomerase for conversion, with the amount of glucose isomerase to be 0.1 to 0.2% of the weight of saccharified liquid; the conversion temperature controlled at 45~55° C. and the conversion time at 20~30 hours, and then heating to 85~95° C., to inactivate the glucose isomerase to obtain heterogeneous sugar liquid; (6) concentration: concentrating the heterogeneous sugar liquid obtained in step (5) with a rotary evaporator, with the concentration temperature controlled at 50~60° C., and concentrating until the solids content to be 60~70%; (7) packaging: cooling down the concentrates obtained in step (6) to 30~40° C., and packaging to obtain the finished products.

CN104323380A disclosed a method for producing *Pachyrhizus* beverage; peeingl off the fruit skin of 50 kg *Pachyrhizus* by hands, washing once with water; cutting the *Pachyrhizus* into fine grains, putting into a deep pot and adding water to soak for 10 min, then heating to boil and maintaining for 20 min, and then sucking the liquid to a stainless steel container through a water pump to precipitate for 1 day, and then filtering once through a filter screen; weighing 2 tons of liquid and pouring to a mixer, then adding 15 kg of citric acid, 20 kg of white sugar, 2 g of flavor and 10 g of sodium benzoate, stirring for 15 min using a mixer, and then delivering to the fine filter to filter through a sanitary pump, then entering the liquid storage tank, transporting to a plastic bottle with a sanitary pump for automatic filling, and then covering and packaging them.

SUMMARY OF PRESENT INVENTION

The object of the invention is to overcome the drawbacks of prior arts and provide a novel method for processing *Pachyrhizus* juice concentrate with good taste and stable color value.

To achieve the object, the present invention adopts the following technical solutions:

A method for processing *Pachyrhizus* juice concentrate with good taste and stable color value, comprises the following steps:

(1) pretreatment of raw materials: selecting undamaged mature *Pachyrhizus*, cleaning in magnetized water; adding 5%-15 wt % flocculent aluminum chloride, 5-15 wt % hydrogen peroxide to the magnetized water, and introducing ozone and UV irradiation to a cleaning pool while cleaning;

(2) thoroughly removing residual substances on the surface of the *Pachyrhizus* using a conveyor belt that can spray water; filtering the water and weighing, juicing the *Pachyrhizus* with a juicer, and collecting the debris and *Pachyrhizus* crude juice in a unified manner;

(3) high-temperature enzymolysis: adding 0.3-0.5 time of clean water to the above debris and *Pachyrhizus* juice, adding 300 ml/T (raw material) high-temperature amylase, then performing enzymolysis for 30 min at 95° C.;

(4) juicing: juicing with a belt-press filter, to obtain the *Pachyrhizus* juice;

(5) debitterizing anti-oxidation treatment of juice: passing the *Pachyrhizus* juice through a magnetization duct with the magnetic field strength of 6000-10000 gauss;

(6) pasteurization: 100° C.±4° C., 20-30 s;

(7) acidity adjustment: adjusting the acidity to total acid being 0.9%@45BX using citric acid;

(8) enzymolysis: adding raw materials of glucoamylase 750 ml/T raw material, pectinase 60 ml/T, activated carbon 2 kg/T, bentonite 1 kg/T to the *Pachyrhizus* juice after acidity adjustment, then performing enzymolysis for 110 min;

(9) Secondary pasteurization: 100° C.±4° C., 20-30 s; cooling to room temperature:

(10) ultrafiltration: performing ultrafiltration for the *Pachyrhizus* juice cooled in step (7) with a microfiltration membrane of 0.45 μm.

(11) concentration: concentrating to 40-45BX, standing still at room temperature for 24 h;

(12) filtering through a cardboard to obtain the finished product.

Further, for the magnetization duct, wires are twined around an outer edge of a metallic duct, and the current is introduced inside the wire, with the electromagnetic direction opposite to the liquid flow direction.

Further, the amount of the high-temperature amylase added is about 300 ml/T (raw material).

Further, the step (1) contains the ultrasonic cleaning.

The application provides another method for processing *Pachyrhizus* juice concentrate with good taste and stable color value, comprising the following steps:

(1) pretreatment of raw materials: selecting undamaged mature *Pachyrhizus*, cleaning in magnetized water; adding 5%-15 wt % flocculent aluminum chloride, 5-15 wt % hydrogen peroxide to the magnetized water, and introducing ozone and UV irradiation to the cleaning pool while cleaning;

(2) thoroughly removing the residual substances on the surface of the *Pachyrhizus* using a conveyor belt that can spray water; filtering the water and weighing, juicing the *Pachyrhizus* with a juicer, and collecting the debris and *Pachyrhizus* crude juice in a unified manner;

(3) high-temperature enzymolysis: adding 1.8 kg of clean water to the above debris and *Pachyrhizus* juice, adding high-temperature amylase, then performing enzymolysis for 30 min at 95° C.;

(4) juicing: juicing with a belt-press filter, to obtain the *Pachyrhizus* juice;

(5) debitterizing anti-oxidation treatment of juice: passing the *Pachyrhizus* juice through a magnetization duct with the magnetic field strength of 6000-10000 gauss;

(6) pasteurization: 100° C., 20-30 s; cool down to 53° C., to obtain the original juice 5.5 kg, 7.78BX;

(7) acidity adjustment: adding 23.540 g citric acid;

(8) enzymolysis: adding raw materials of glucoamylase 747 ml/T, pectinase 50 ml/T activated carbon 3 kg/T, bentonite 1 kg/T to the *Pachyrhizus* juice after acidity adjustment, then performing enzymolysis for 110 min;

(9) secondary pasteurization: 100° C., 20-30 s; cooling to 53° C.;

(8) filtration: filtering twice through a microfiltration membrane of 0.45 μm;

(10) Acidity adjustment: adjusting the acidity to 3.54%@60BX;

(11) concentration: concentrating to 50BX-60BXBX, standing still at room temperature for 24 h;

(12) filtering through a cardboard to obtain the finished product.

The invention can achieve the following advantages and effects:

1. The method for processing *Pachyrhizus* juice concentrate in the invention has proven that, the conventional method by adding VC for color protection is not suitable for the *Pachyrhizus* juice concentrate; without adding VC, the product browning is significantly reduced, and finally the color value of the samples is well controlled. Thus, the application method is simple and suitable for industrial production.

2. The consumption of raw materials for lossless processing in the laboratory provided is 6.61 tons (the final sample is calculated by 50BX), and it is found that it has no significant effect on the product color values without peeling. In this invention, it has been discovered, when no VC is added, the product browning is significantly reduced during the processing, and the final color value of samples is controlled. The color value and turbidity stability of the *Pachyrhizus* juice produced in the invention are very excellent under the target PH@10BX=3.4, 3.54%@60BX (equivalent to the experiment 1), which even needs not secondary filtration.

3. By adding flocculants, hydrogen peroxide, ozone and UV to the clean water, it can produce transient highly active hydroxyl and oxygen radicals, to inactivate the *Bacillus, E. coli*, bacteriophages, and *Aspergillus*, etc., and decompose formic acid, organophosphorus pesticides, carbamates and other toxic substances.

4. The method for processing *Pachyrhizus* juice concentrate in the invention has proven that, the conventional method by adding VC for color protection is not suitable for the *Pachyrhizus* juice concentrate; without adding VC, the product browning is significantly reduced during the processing, and finally the color value of the samples is well controlled. Thus, the application method is simple and suitable for industrial production.

5. The method for processing *Pachyrhizus* juice concentrate in the embodiment 2 includes multiple times of pH adjustment based on the principle of adding less or no citric acid. A number of tests have shown that the pH value of liquid has great influence on the activity of enzymic preparations. The pH value of *Pachyrhizus* juice is 5.68@7.7BX; and if the sugar degree during the processing is lower, the pH value will be higher, close to or exceeding the upper limit of the glucoamylase activity (for example, the activity of Suhong glucoamylase is significantly reduced when pH value is above 5). The effect of the enzyme preparations has great influence on the turbidity stability of the final product (in combination with the sweet potato juice process). Therefore, it is necessary to control the pH value of the juice within the range of 3.8-4.8 during the processing, and control the acidity around 1.2%@60BX(0.7-0.9%@45BX).

DETAILED DESCRIPTION OF PREFERRED EMBODIMENTS

The invention is further described in combination with the specific embodiments. The following embodiments are illustrative rather than restrictive, which cannot restrict the scope of protection of the invention.

Embodiment 1

A method for processing *Pachyrhizus* juice concentrate with good taste and stable color value, comprises the following steps:

(1) pretreatment of raw materials: selecting uandamaged mature *Pachyrhizus*, cleaning in magnetized water; adding 5%-15 wt % flocculent aluminum chloride, 5-15 wt % hydrogen peroxide to the magnetized water, and introducing ozone and UV irradiation to the cleaning pool while cleaning; and ultrasound can also be added.

There are many fissures on the surface of *Pachyrhizus*, and the sand in the gap is difficult to remove. The existing method cannot clean them thoroughly. Adding flocculants and hydrogen peroxide to the magnetized water can achieve two purposes: firstly, the flocculants can bring out the sand in the gap to achieve thorough removal of sand. The hydrogen peroxide can kill the bacteria in the water and on the surface of the *Pachyrhizus*, to ensure cleanliness of raw material, and together with the ozone and ultraviolet light, it can achieve thorough sterilization.

(2) thoroughly removing the residual substances on the surface of the *Pachyrhizus* using a conveyor belt that can spray water; filtering the water and weighing, juicing the *Pachyrhizus* with a juicer, and collecting the debris and *Pachyrhizus* crude juice in a unified manner.

(3) high-temperature enzymolysis: adding 1.8 kg of clean water to the above debris and *Pachyrhizus* juice, adding high-temperature amylase, then performing enzymolysis for 30 min at 95° C.;

(4) juicing: juicing with a belt-press filter, to obtain the *Pachyrhizus* juice;

(5) debitterizing anti-oxidation treatment of juice: passing the *Pachyrhizus* juice through a magnetization duct with the magnetic field strength of 6000-10000 gauss;

*Pachyrhizus* juice is in a transparent color and tastes slightly sweet. After pasteurization and acidity adjustment, the color becomes yellow and it tastes slightly bitter, mainly because the phenols in the *Pachyrhizus* juice is oxidized into anthraquinone, and the biological activity decreases, the antioxidant activity decreases; the tests have shown that after magnetization, the color and taste basically maintain unchanged in the subsequent process.

(6) pasteurization: 100° C.±4° C., 20-30 s; cooling down to 53° C., to obtain the original juice 5.5 kg, 7.7BX;

(7) acidity adjustment: adding 23,540 g citric acid:

(8) enzymolysis: adding raw materials of glucoamylase 747 ml/T, pectinase 50 ml/T, activated carbon 3 kg/T, bentonite 1 kg/T to the *Pachyrhizus* juice after acidity adjustment, then performing enzymolysis for 110 min;

(9) secondary pasteurization: 100° C.±4° C., 20-30 s; cooling to 53° C.;

(8) filtration: filtering twice through a microfiltration membrane of 0.45 µm;

(10) acidity adjustment: adjusting the acidity to 3.54%@60BX;

(11) concentration: concentrating to 50BX-60BXBX, standing still at room temperature for 24 h:

(12) filtering through a cardboard to obtain the finished product.

Embodiment 2

A method for processing *Pachyrhizus* juice concentrate with good taste and stable color value, comprises the following steps:

(1) pretreatment of raw materials: selecting undamaged mature *Pachyrhizus*, cleaning in magnetized water; adding 5%-15 wt % flocculent aluminum chloride, 5-15 wt % hydrogen peroxide to the magnetized water, and introducing ozone and UV irradiation to the cleaning pool while cleaning; and ultrasound can also be added.

There are many fissures on the surface of *Pachyrhizus*, and the sand in the gap is difficult to remove. The existing method cannot clean them thoroughly. Adding flocculants and hydrogen peroxide to the magnetized water can achieve two purposes: firstly, the flocculants can bring out the sand in the gap to achieve thorough removal of sand. The hydrogen peroxide can kill the bacteria on the water and the surface of the *Pachyrhizus*, to ensure cleanliness of raw material, and together with the ozone and ultraviolet light, it can achieve thorough sterilization.

(2) thoroughly removing the residual substances on the surface of the *Pachyrhizus* using a conveyor belt that can spray water; filtering the water and weighing, juicing the *Pachyrhizus* with a juicer, and collecting the debris and *Pachyrhizus* crude juice in a unified manner;

(3) high-temperature enzymolysis: adding 0.3-0.5 time of clean water to the above debris and *Pachyrhizus* juice, adding high-temperature amylase of about 300 ml/T raw material, then performing enzymolysis for 30 min at 95° C.;

(4) juicing: juicing with a belt-press filter, to obtain the *Pachyrhizus* juice;

(5) debitterizing anti-oxidation treatment of juice: passing the *Pachyrhizus* juice through a magnetization duct with the magnetic field strength of 6000-10000 gauss;

*Pachyrhizus* juice is in a transparent color and tastes slightly sweet. After pasteurization and acidity adjustment, the color becomes yellow and it tastes slightly bitter, mainly because the phenols in the *Pachyrhizus* juice is oxidized into anthraquinone, and the biological activity decreases, the antioxidant activity decreases; the tests have shown that after magnetization, the color and taste are basically maintain unchanged in the subsequent process.

(6) pasteurization: 100° C.±4° C., 20-30 s;

acidity adjustment adjusting the acidity to teal acid being 0.9%@45BX using citric acid;

(7) enzymolysis: adding raw materials of glucoamylase 750 ml/T, pectinase 60 ml/T, activated carbon 2 kg/T, bentonite 1 kg/T to the *Pachyrhizus* juice after acidity adjustment, then performing enzymolysis for 110 min;

(8) secondary pasteurization: 100° C.±4° C., 20-30 s; cooling to temperature;

(9) ultrafiltration: performing ultrafiltration of the *Pachyrhizus* juice cooled in step (7) with a microfiltration membrane of 0.45 µm; (the rated pore size of the microfiltration membrane is in range of 0.001-9.02 µm)

(10) concentration: concentrating to 40-45BX, standing still at room temperature for 24 h;

Filtering through a cardboard to obtain the finished product.

Various indicators of finished products shall meet the following requirements:

| Index | Sugar Degree | Total acidity @45BX | pH | A410 | T625 | Turbidity |
|---|---|---|---|---|---|---|
| Value | 40-45BX | 0.7-0.9% | 4.6-4.8 | ≤0.1 | ≥95% | ≤3 |

We claim:

1. A method for making concentrated clear *Pachyrhizus erosus* juice, comprising the following steps:

pretreating raw material, wherein the raw material comprises undamaged *Pachyrhizus erosus*, and the pretreating comprises cleaning the undamaged *Pachyrhizus erosus* in magnetized water, the magnetized water comprising 5-15 wt % flocculent aluminum chloride and 5-15 wt % hydrogen peroxide; and introducing ozone and UV irradiation to the magnetized water while cleaning;

thoroughly removing residual substances on the surface of the cleaned *Pachyrhizus erosus* using a conveyor belt that sprays water, and then weighing the *Pachyrhizus erosus* and then juicing the *Pachyrhizus erosus* with a juicer to form *Pachyrhizus erosus* crude juice and debris; and collecting the *Pachyrhizus erosus* crude juice and debris;

performing high temperature enzymolysis by adding to the *Pachyrhizus erosus* crude juice and debris: clean water and 300 mL of high-temperature amylase per ton of the raw material to form a mixture, and then performing enzymolysis for 30 min at 95° C. on the mixture;

juicing the enzymolysis treated mixture with a belt-press filter, to obtain filtered *Pachyrhizus erosus* juice;

debitterizing and anti-oxidation treating the filtered *Pachyrhizus erosus* juice by passing the filtered *Pachyrhizus erosus* juice through a magnetization duct with the magnetic field strength of 6,000-10,000 gauss, and then pasteurizing the debittered and anti-oxidized *Pachyrhizus erosus* juice at 100° C.±4° C. for 20-30 seconds;

adjusting the acidity of the pasteurized *Pachyrhizus erosus* juice using citric acid;

adding 750 mL of glucoamylase per ton of the raw material, 60 mL of pectinate per ton of the raw material, 2 kg of activated carbon per ton of the raw material, and 1 kg of bentonite per ton of the raw materials, to the *Pachyrhizus erosus* juice after acidity adjustment, then performing enzymolysis for 110 min;

performing a secondary pasteurization at 100° C.±4° C., for 20-30 seconds on the second enzymolysis treated *Pachyrhizus erosus* juice, and then cooling the *Pachyrhizus erosus* juice to room temperature;

performing ultrafiltration on the cooled *Pachyrhizus erosus* juice using a microfiltration membrane;

concentrating the ultrafiltered *Pachyrhizus erosus* juice to 40-45° Bx, and then holding the *Pachyrhizus erosus* juice still at room temperature for 24 hours, wherein the concentrated *Pachyrhizus erosus* juice has a total acid content of 0.7-0.9 wt. %;

filtering the concentrated *Pachyrhizus erosus* juice to obtain the finished product.

2. The method according to claim 1, wherein a rated pore size of the microfiltration membrane is 0.001-0.02 μm.

3. The method according to claim 1, wherein for the magnetization duct, wires are twined around an outer edge of a metallic duct, and current is introduced inside the wire, with an electromagnetic direction opposite to a liquid flow direction.

4. The method according to claim 1, wherein the step of cleaning the undamaged *Pachyrhizus erosus* further comprises ultrasonic cleaning.

* * * * *